United States Patent
Zhang et al.

(10) Patent No.: US 7,529,390 B2
(45) Date of Patent: May 5, 2009

(54) AUTOMATICALLY CROPPING AN IMAGE

(75) Inventors: Lei Zhang, Beijing (CN); Mingju Zhang, Beijing (CN); Wei-Ying Ma, Beijing (CN); Yan-Feng Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 11/242,605

(22) Filed: Oct. 3, 2005

(65) Prior Publication Data

US 2007/0076979 A1    Apr. 5, 2007

(51) Int. Cl.
G06K 9/00    (2006.01)
(52) U.S. Cl. ............................................ 382/118
(58) Field of Classification Search .................. 382/118
See application file for complete search history.

(56) References Cited

U.S. PATENT DOCUMENTS

| | | | | |
|---|---|---|---|---|
| 5,978,519 | A * | 11/1999 | Bollman et al. | 382/282 |
| 6,181,805 | B1 * | 1/2001 | Koike et al. | 382/118 |
| 6,813,395 | B1 * | 11/2004 | Kinjo | 382/305 |
| 7,133,571 | B2 * | 11/2006 | Cheatle | 382/282 |
| 7,471,827 | B2 * | 12/2008 | Xie et al. | 382/173 |
| 2002/0114535 | A1 * | 8/2002 | Luo | 382/282 |
| 2004/0165784 | A1 | 8/2004 | Xie et al. | |
| 2004/0264780 | A1 * | 12/2004 | Zhang et al. | 382/224 |
| 2005/0196047 | A1 * | 9/2005 | Owechko et al. | 382/224 |

OTHER PUBLICATIONS

Mona et al., Model based human face detection, 2000,IEEE, 0-7803-6297-7, 227-230.*
Xiao, Rong et al., "Robust Multi-Pose Face Detection in Images," IEEE Trans. on CSVT, Special Issue on Biometrics, 2003.
Ma, Yu- Fei and Zhang, Hong-Jiang, "Contrast-Based Image Attention Analysis by Using Fuzzy Growing," MM '03, Nov. 2-8, 2003, Berkeley, California, Copyright 2003 ACM.
Liu, Hao, et al., "Automatic Browsing of Large Pictures on Mobile Devices," MM '03, Nov. 2-8, 2003, Berkeley, California, Copyright 2003 ACM.
Byers, Zachary et al., "An Autonomous Robot Photographer," International Conference on Intelligent Robots and Systems, 2003.
Grill, Tom and Scanlon, Mark, "Photographic Composition: Guidelines for Total Image Control Through Effective Design," Chapter 2 "Graphic Controls," American Photographics Book Publishing, 1990.
Gooch, Bruce et al., "Artistic Composition for Image Creation," Eurographics Workshop on Rendering, 2001.
Kennedy, J., et al., Particle Swarm Optimization, IEEE International Conference on Neural Networks, Perth, Australia, 1995.

* cited by examiner

*Primary Examiner*—Jingge Wu
*Assistant Examiner*—Jayesh A Patel
(74) *Attorney, Agent, or Firm*—Perkins Coie LLP (57) ABSTRACT

A method and system for cropping an image is provided. The cropping system automatically crops an image by selecting an image template whose condition is best satisfied by the image and then by selecting a cropping of the image that best attains the goal of the selected image template. The cropping system may use a metric or objective function to rate how well a cropping attains the goal of the selected image template. The cropping system may apply various optimization algorithms to identify a cropping that is the best as indicated by the metric. The cropping system can then automatically crop the image based on the identified cropping.

9 Claims, 7 Drawing Sheets

AUTOMATICALLY CROPPING AN IMAGE

BACKGROUND

The cropping of digital photographs plays a key role in their ultimate composition. By appropriately cropping a digital photograph, a desired aspect ratio and composition can be achieved. Most commercial photographic editing software provides for either manual cropping of photographs by a user or automatic cropping to a desired aspect ratio. When a photograph is automatically cropped, the software typically crops so that the center of the photograph is at the center of the cropped photograph. Such automatic cropping will not necessarily provide a more desirable composition of the photograph and may indeed reduce the desirability of the composition. Although manual cropping can result in a desired composition with the desired aspect ratio, it can take a user a considerable amount of time to crop all the photographs that can be taken and stored by a digital camera with even a modest amount of memory. Moreover, an amateur photographer may not know how to crop a photograph to provide a visually pleasing composition.

When an experienced photographer wants to manually crop a photograph, the photographer may employ various "rules" of photography. One such rule is the rule of thirds. According to the rule of thirds, a photograph is first divided into thirds both vertically and horizontally. The rule of thirds specifies that a harmonious balance within a photograph is achieved when the objects of the photograph are aligned with the vertical and horizontal lines that divide the thirds, or their intersections. Another such rule is the golden mean rule. According to the golden mean rule, the most aesthetically pleasing aspect ratio of a photograph is when the ratio of the width to the height is the same as the ratio of the height to the width plus the height. This ratio occurs when the aspect ratio is approximately 5 by 8.

SUMMARY

A method and system for cropping an image is provided. The cropping system automatically crops an image by selecting an image template whose condition is best satisfied by the image and then by selecting a cropping of the image that best attains the goal of the selected image template. The condition of an image template specifies the characteristics of an image to which the image template applies. The goal of an image template specifies the ideal locations of the significant areas within an image that satisfies the condition of the image template. The cropping system selects a cropping of the image that best attains the goal of the selected image template. The cropping system may use a metric or objective function to rate how well a cropping attains the goal of a selected image template. Since the image templates attempt to define an artistically ideal composition for an image, this metric measures the artistic composition of a cropping. The cropping system may apply various optimization algorithms to identify a cropping that is the best as indicated by the metric. The cropping system can then automatically crop the image based on the identified cropping.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A method and system for cropping an image is provided. In one embodiment, the cropping system automatically crops an image by selecting an image template whose condition is best satisfied by the image and then by selecting a cropping (i.e., location and size) of the image that best meets the goal of the selected image template. The condition of an image template specifies the characteristics of an image to which the image template applies. For example, an image template may have a condition of two faces of medium size. An image that contains only two faces of medium size wherever located on the image would satisfy the condition of that image template. The goal of an image template specifies the ideal locations of the significant areas within an image that satisfies the condition of the image template. A significant area may be a face area or an attended area as described below. The cropping system selects a cropping of the image that best meets the goal of the selected image template. For example, if the goal of the image template is to center the two face areas within the cropped image and to align the face areas with the upper line defined by the rule of thirds, then the cropping system attempts to identify the cropping that places the face areas of the image in the center of the cropped image and aligned with the upper line defined by the rules of thirds. The attainability of a goal of an image template varies based on the location of the significant areas of an image. For example, if the two faces of an image are already centered and aligned with the upper line, then the goal is mostly attainable by cropping the image to the desired aspect ratio. If, however, one face is near the upper left corner of the image and the other face is near the lower right corner of the image, then the goal is not very attainable. The cropping system may use a metric or objective function to rate how well a cropping attains the goal of a selected image template. Since the image templates attempt to define an artistically ideal composition for an image, this metric measures the artistic composition of a cropping. The cropping system may apply various optimization algorithms to identify a cropping that is the best as indicated by the metric. The cropping system can then automatically crop the image based on the identified cropping. In this way, the cropping system can automatically crop images based on a cropping that is determined as indicated by a metric to provide the best composition.

In one embodiment, the cropping system may also calculate a combined metric that factors in goals other than just artistic composition. These goals may include an original composition goal and a face preserving composition goal. The original composition goal attempts to preserve the original composition of the image. The assumption is that the photographer tried to select an appropriate composition when the photograph was taken. The cropping system gives some weight to that original composition when rating a cropping. The face preserving composition goal attempts to include faces of the image in the cropped image. The assumption is that faces are important to an image and should be included in the cropped image whenever possible. The cropping system gives a negative weight to croppings that do not include all the faces of an image. By using these composition metrics, the cropping system provides a metric that seeks to rate the balance between artistic composition, original composition, and face preserving composition.

In one embodiment, the cropping system defines 14 image templates with conditions that categorize images. The cropping system defines image templates based on characteristics of images such as number and size of faces and number of attended areas. An attended area is a non-face region of interest. Table 1 lists the templates of the cropping system in one embodiment. One skilled in the art will appreciate that more or fewer templates may be defined and the conditions may be defined in terms of other characteristics of an image. The characteristics may include original aspect ratio of the image, areas of brightness, areas that are in focus, each human body area, and so on. Each row of Table 1 corresponds to an image template. The condition column specifies the condition of the image template, the template ID column contains the identifier of the image template, and the template name column specifies the name of the image template. $N_{face}$ represents the number of faces of the image, $S_{face}$ represents the size of the face area of the image, $T_{Xlarge}$ represents the minimum size of an average large face of an image with X faces, $T_{Xsmall}$ represents the maximum size of an average small face of an image with X faces, $S_{human}$ represents the size of the area of the image that contains humans, and $N_{area}$ represents the number of attended areas of the image.

Figure 1:
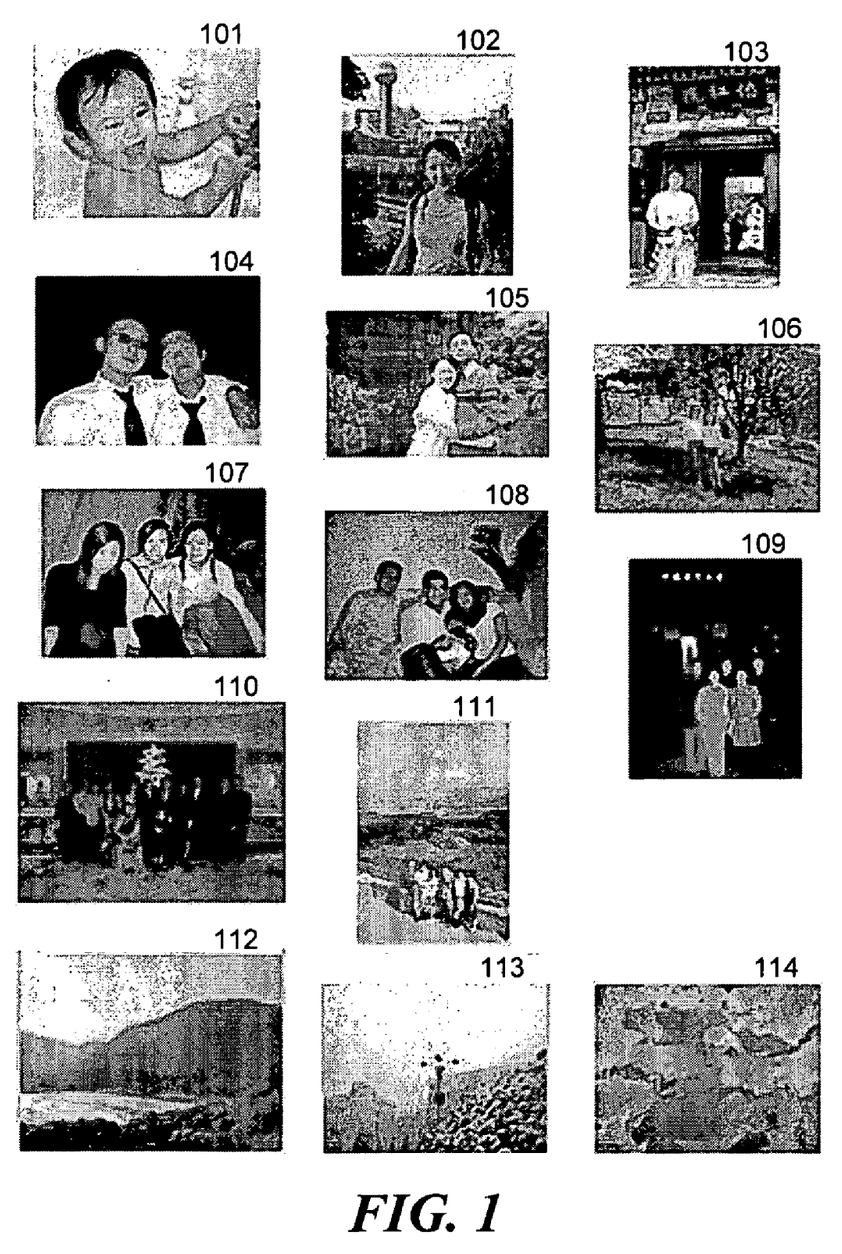
FIG. 1 illustrates images that satisfy the condition of each of the image templates.

FIG. 1 illustrates images that satisfy the condition of each of the image templates. The reference number column of Table 1 identifies the image of FIG. 1 that satisfies the condition of the corresponding image template. For example, image 101 has one large face so it satisfies the condition of image template 1LF, and image 111 has a crowd of small faces so it satisfies the condition of image template CSF.

TABLE 1

| Ref No. | Condition | Template ID | Template Name |
|---|---|---|---|
| 101 | $N_{face} = 1$, $S_{face} \geq T_{1large}$ | 1LF | one large face (e.g., passport) |
| 102 | $N_{face} = 1$, $T_{1large} > S_{face} > T_{1small}$ | 1MF | one medium face |
| 103 | $N_{face} = 1$, $T_{1small} \geq S_{face}$ | 1SF | one small face |
| 104 | $N_{face} = 2$, $S_{face} \geq T_{2large}$ | 2LF | two large faces |
| 105 | $N_{face} = 2$, $T_{2large} > S_{face} > T_{2small}$ | 2MF | two medium faces |
| 106 | $N_{face} = 2$, $T_{2small} \geq S_{face}$ | 2SF | two small faces |
| 107 | $N_{face} = 3, 4, \text{or } 5$, $S_{face} \geq T_{3large}$ | MLF | multiple (i.e., 3-5) large faces |
| 108 | $N_{face} = 3, 4, \text{or } 5$, $T_{3large} > S_{face} > T_{3small}$ | MMF | multiple (i.e., 3-5) medium faces |
| 109 | $N_{face} = 3, 4, \text{or } 5$, $T_{3small} \geq S_{face}$ | MSF | multiple (i.e., 3-5) small faces |

TABLE 1-continued

| Ref No. | Condition | Template ID | Template Name |
|---|---|---|---|
| 110 | $N_{face} \geq 6$, $S_{human} \geq T_{6large}$ | CLF | a crowd (i.e., ≧6) of faces and big human area |
| 111 | $N_{face} \geq 6$, $S_{human} < T_{6large}$ | CSF | a crowd (i.e., ≧6) of faces and small human area |
| 112 | $N_{face} = 0$, $N_{area} = 1$ | SCA | no face and one attended area |
| 113 | $N_{face} = 0$, $N_{area} > 1$ | SCM | no face, >1 attended areas |
| 114 | $N_{face} = 0$, $N_{area} = 0$ | SC | no face and no attended area |

Figure 2:
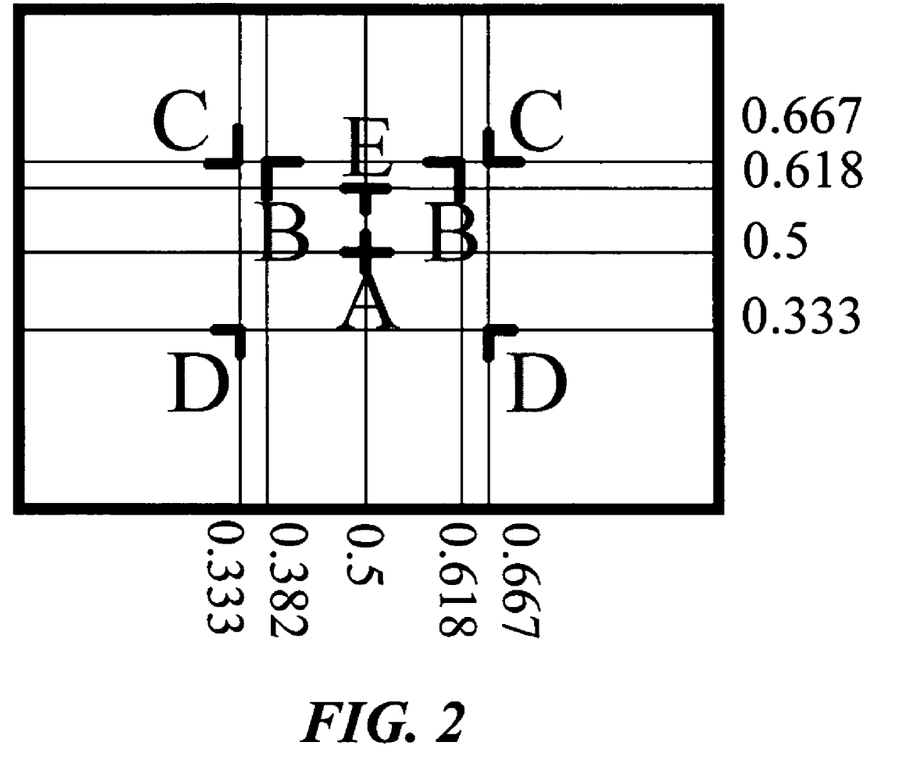
FIG. 2 illustrates the location of various points upon which the goals are based.

In one embodiment, the cropping system defines the goal for the locations of significant areas of an image based on the rule of thirds and the golden mean rule. FIG. 2 illustrates the location of various points upon which the goals are based. Point A ($P_A$) represents the center of the cropped image, points B ($P_C$) represent the intersections of the upper lines defined by the rule of thirds with the left and right lines defined by the golden rectangle, points C ($P_C$) and D ($P_D$) represent the intersections of the upper line and lower line, respectively, defined by the rule of thirds with the left and right lines defined by the rule of thirds, and point E ($P_E$) represents the intersection of the upper line of the golden rectangle with the center line of the cropped image. Table 2 illustrates the goals of the image templates. "Face rectangle" refers to the smallest rectangle that surrounds a face of the image, "face area" refers to the smallest rectangle that surrounds all the faces of the image, "human area" refers to the smallest rectangle that contains the humans of the image, "attended area" refers to the smallest rectangle that contains a region of interest, and "attended view" refers to the smallest rectangle that contains all the regions of interest. $P_M$ and $P_v$ represent the center points of the areas as defined in Table 2. $P_{cp}$ represents the goal location for $P_M$, and $P_{csv}$ represents a conservative location for the location of $P_v$. $P_D$ is not currently used by any template, but may be used when defining additional templates.

TABLE 2

| Template | $P_M$ | $P_v$ | $P_{cp}$ | $P_{csv}$ |
|---|---|---|---|---|
| 1LF | $C_{FA}$ | $C_{AV}$ | $P_A$ | $P_A$ |
| 1MF | $C_{FA}$ | $C_{AV}$ | $P_B$ | $P_E$ |
| 1SF | $C_{FA}$ | $C_{AV}$ | $P_C$ | $P_A$ |
| 2LF | $C_{FA}$ | $C_{AV}$ | $P_A$ | $P_A$ |
| 2MF | $C_{FA}$ | $C_{AV}$ | $P_B$ | $P_E$ |
| 2SF | $C_{FA}$ | $C_{AV}$ | $P_C$ | $P_E$ |
| MLF | $C_{FA}$ | $C_{AV}$ | $P_A$ | $P_A$ |
| MMF | $C_{FA}$ | $C_{AV}$ | $P_E$ | $P_A$ |
| MSF | $C_{FA}$ | $C_{AV}$ | $P_E$ | $P_A$ |
| CLF | $C_{FA}$ | $C_{AV}$ | $P_E$ | $P_E$ |
| CSF | $C_{FA}$ | $C_{AV}$ | $P_E$ | $P_E$ |
| SCA | $C_{AV}$ | $C_{AV}$ | $P_E$ | $P_E$ |
| SCM | $C_{AV}$ | $C_{AV}$ | $P_E$ | $P_A$ |
| SC | $C_{AV}$ | $C_{AV}$ | $P_A$ | $P_A$ |

In one embodiment, the cropping system represents the objective function indicating the rating of a cropping by the following equation:

$$E(R_c) = E_c(R_c) + E_s(R_c) - E_p(R_c) \quad (1)$$

where E represents the total energy or rating of the cropped rectangle $R_c$, $E_c$ represents the energy of the artistic composition, $E_s$ represents the energy of the original composition, and $E_p$ represents the energy of the face preserving composition.

Figure 3:
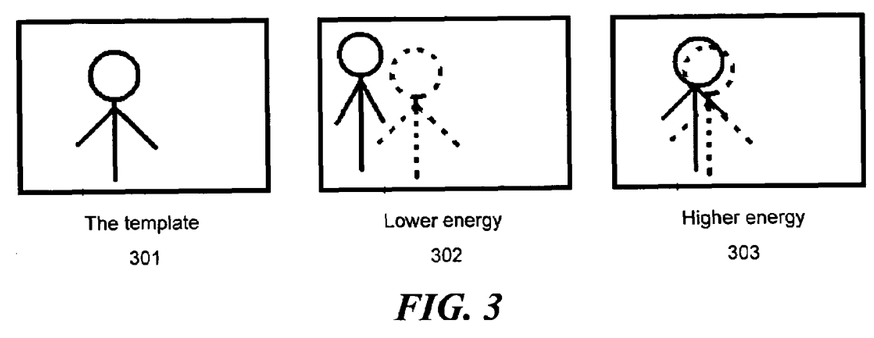
FIG. 3 is a diagram that illustrates the goal of an artistic composition of an image template along with example croppings of an image.

FIG. 3 is a diagram that illustrates the goal of an artistic composition of an image template along with example croppings of an image. Block 301 specifies an image template for an image with one human figure. The image template indicates that the face is to be aligned near the intersection of the upper and left lines defined by the rule of thirds. Blocks 302 and 303 indicate candidate croppings for an image relative to the image template shown in dashed lines. Since the cropping for block 303 results in the human figure being closer to the human figure of the image template than in block 302, the cropping system assigns a higher energy or rating to the cropping of block 303. The cropping system represents the energy of the artistic composition by the following equation:

$$E_c(R_c) = \mu_1 \cdot E_1(R_c) + \mu_2 \cdot E_2(R_c) \tag{2}$$

where $E_1$ represents the energy for the primary subject of the image (e.g., face area), $E_2$ represents the energy for the secondary subject of the image (e.g., attended view), $\mu_1$ represents the weight of $E_1$, and $\mu_2$ represents the weight of $E_2$. The system sets $\mu_1$ to 1 when the image has a primary subject such as a face or human area and sets it to 0 otherwise. The system sets $\mu_2$ to 1 when the image has attended areas and sets it to 0 otherwise. The cropping system represents the energy for the primary subject of the image by the following equation:

$$E_1(R_c) = \alpha \cdot \max\left(\exp\left(-\frac{\|P_{cp} - P_M\|}{d}\right), \exp\left(-\frac{\|P_{csv} - P_M\|}{d}\right)\right) \tag{3}$$

where d represents the length of the diagonal of the cropped rectangle $R_c$ and $\alpha$ represents an empirically determined weight for the contribution of the energy of the primary subject relative to the energy of the secondary subject. The cropping system represents the energy for the secondary subject of the image by the following equation:

$$E_2(R_c) = \frac{w}{n_a} \sum_{areas} \exp\left(-\frac{1}{d}\min_L \|L_{thirds} - P_v\|\right) \tag{4}$$

where $L_{thirds}$ represents the vertical lines defined by the rule of thirds in the cropped rectangle, $P_v$ represents the center point of the attended area, $n_a$ represents the number of attended areas, and w represents an empirically determined weight for the contribution of the secondary subject.

The cropping system defines the energy of the original composition by the following equation:

$$E_s(R_c) = \phi \cdot \left(\left(\frac{\beta}{S_v} + \frac{\lambda}{S_t}\right) * (S_i + S_c) + \eta \cdot \exp(-\|P_c - P_v\|)\right) \tag{5}$$

where $S_v$ represents the area of the attended view, $S_t$ represents the total area of the image, $S_i$ represents the intersection of the cropped image and the attended view, $S_c$ represents the area of the cropped rectangle, $P_c$ represents the center of the cropped rectangle, $P_v$ represents the center as defined in Table 2, $\beta$, $\lambda$, and $\eta$ represent empirically determined constants, and $\phi$ represents an empirically determined weight for the energy of the original composition relative to the artistic composition. Thus, the energy will be larger when the intersection of the cropped rectangle and the attended view is larger, when the area of the cropped rectangle is larger, and when the center of the cropped rectangle is close to the center of the attended view.

The cropping system defines the energy of the face preserving composition by the following equation:

$$E_p(R_c) = \sigma \cdot \sum_{f \in F} (S(R_f \cap \overline{R_c})/S_{total}) \tag{6}$$

where $R_f$ represents one of the face rectangles of the image, S( ) represents the area of the input rectangle, $S_{total}$ represents the size of the face area, and a is an empirically determined constant to weight the face preserving composition relative to the artistic composition. The face preserving composition tends to force the cropped rectangle to contain more faces.

In one embodiment, the cropping system uses a particle swarm optimization algorithm to identify the cropping of the image that best meets the goal of the selected image template as defined by the objective function. The cropping system may assume a fixed aspect ratio (e.g., 8 by 5) and selects a location for the upper right corner of the cropping rectangle along with one of the dimensions of the cropping rectangle. The cropping system calculates the other dimension of the cropping rectangle based on the aspect ratio. Alternatively, the cropping system may also determine an optimal aspect ratio. One skilled in the art will appreciate that various optimization techniques may be used to select the cropping that best meets the goals of an image template.

Figure 4:
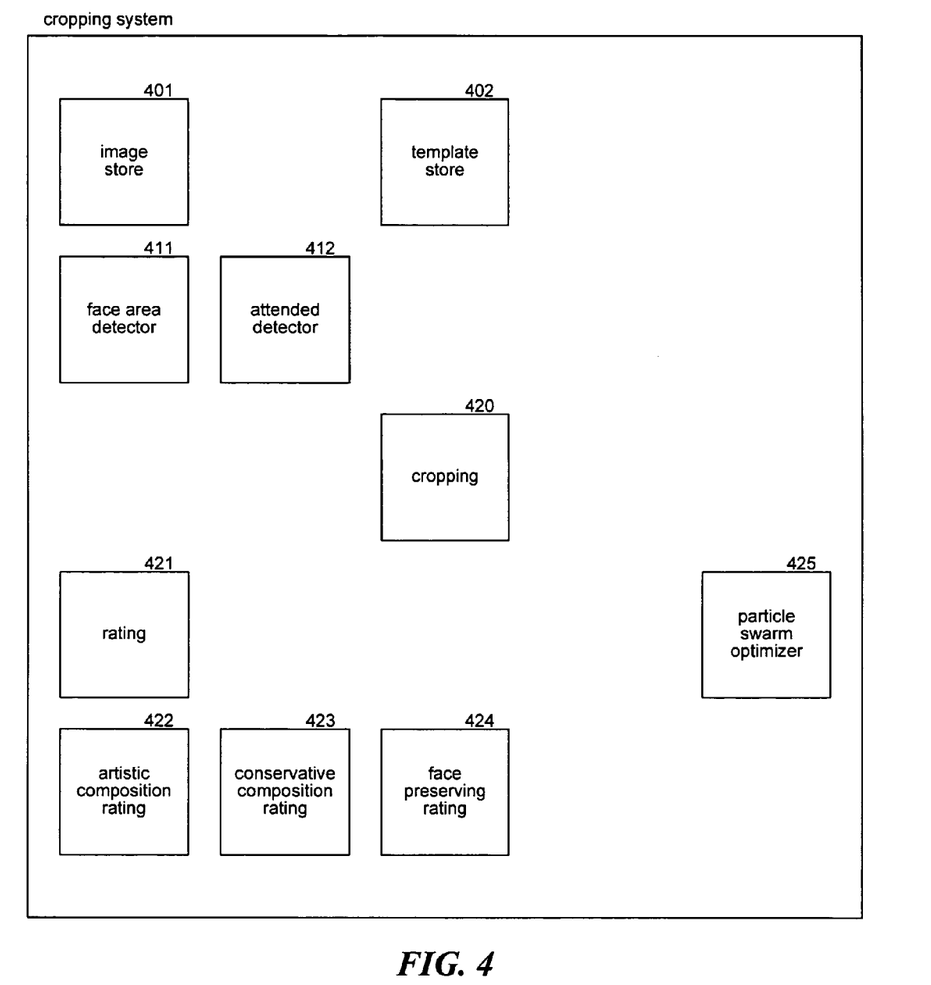
FIG. 4 is a block diagram that illustrates components of the cropping system in one embodiment.

FIG. 4 is a block diagram that illustrates components of the cropping system in one embodiment. The cropping system includes an image store 401 and an image template store 402. The image store contains the images to be cropped by the cropping system. The image template store defines the image templates and contains the information of Tables 1 and 2 as described above. The cropping system also includes a face area detector component 411 and an attended area detector component 412. The face area detector component may use a variety of well-known face detection algorithms. See, e.g., Xiao, R., Li, M. J., Zhang, H. J., "Robust Multi-Pose Face Detection in Images," IEEE Trans. on CSVT, Special Issue on Biometrics, 2003. The attended area detector component may use a variety of well-known attended area (e.g., regions of interest) detection algorithms. See, e.g., Ma, Y. F., Zhang, H. J., "Contrast-Based Image Attention Analysis by Using Fuzzy Growing," ACM Multimedia 2003, Berkeley, Calif., USA, pp. 374-381. A cropping component 420 identifies the face areas and attended areas of an image, selects an image template from the image store, and invokes a particle swarm optimizer component 425 to identify a cropping rectangle. The particle swarm optimizer component invokes a rating component 421, which provides an objective function that the particle swarm optimizer component attempts to optimize. The rating component invokes an artistic composition rating component 422, an original composition rating component 423, and a face preserving composition rating component 424. The rating component combines the ratings of the rating sub-components to generate an overall rating for a cropping.

The computing devices on which the cropping system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the cropping system. In addition, the data structures and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the cropping system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on.

The cropping system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 5:
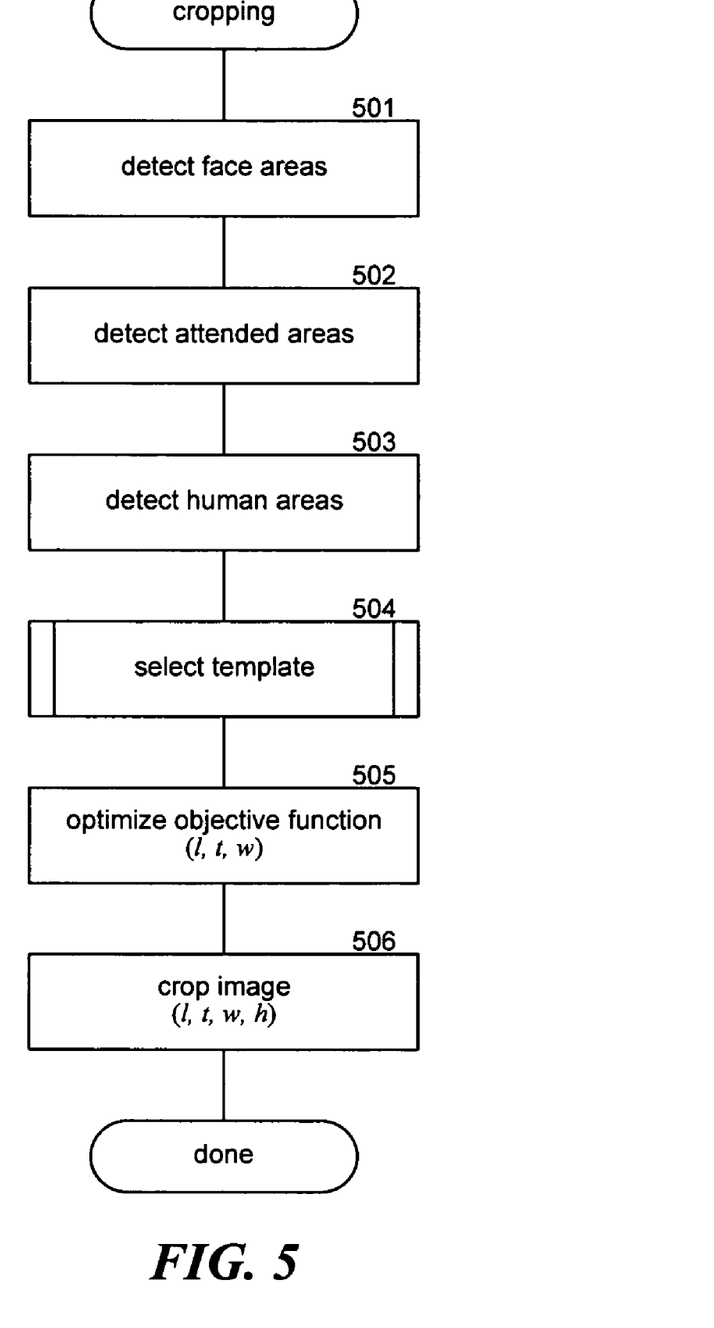
FIG. 5 is a flow diagram that illustrates the processing of the cropping component in one embodiment.

FIG. 5 is a flow diagram that illustrates the processing of the cropping component in one embodiment. The component is passed an image and selects a cropping for the image. In block 501, the component invokes the face area detector component to detect the face rectangles and face area of an image. In block 502, the component invokes the attended area detector component to detect the attended areas and the attended view of an image. In block 503, the component detects the human area of an image. The human area may be identified as a region of interest that contains the face area of the image. In block 504, the component invokes the select image template component to select the image template whose condition is satisfied by the image. In block 505, the component invokes the particle swarm optimizer component to identify the cropping that tends to optimize the objective function. In block 506, the component crops the image based on the identified cropping and then completes.

Figure 6:
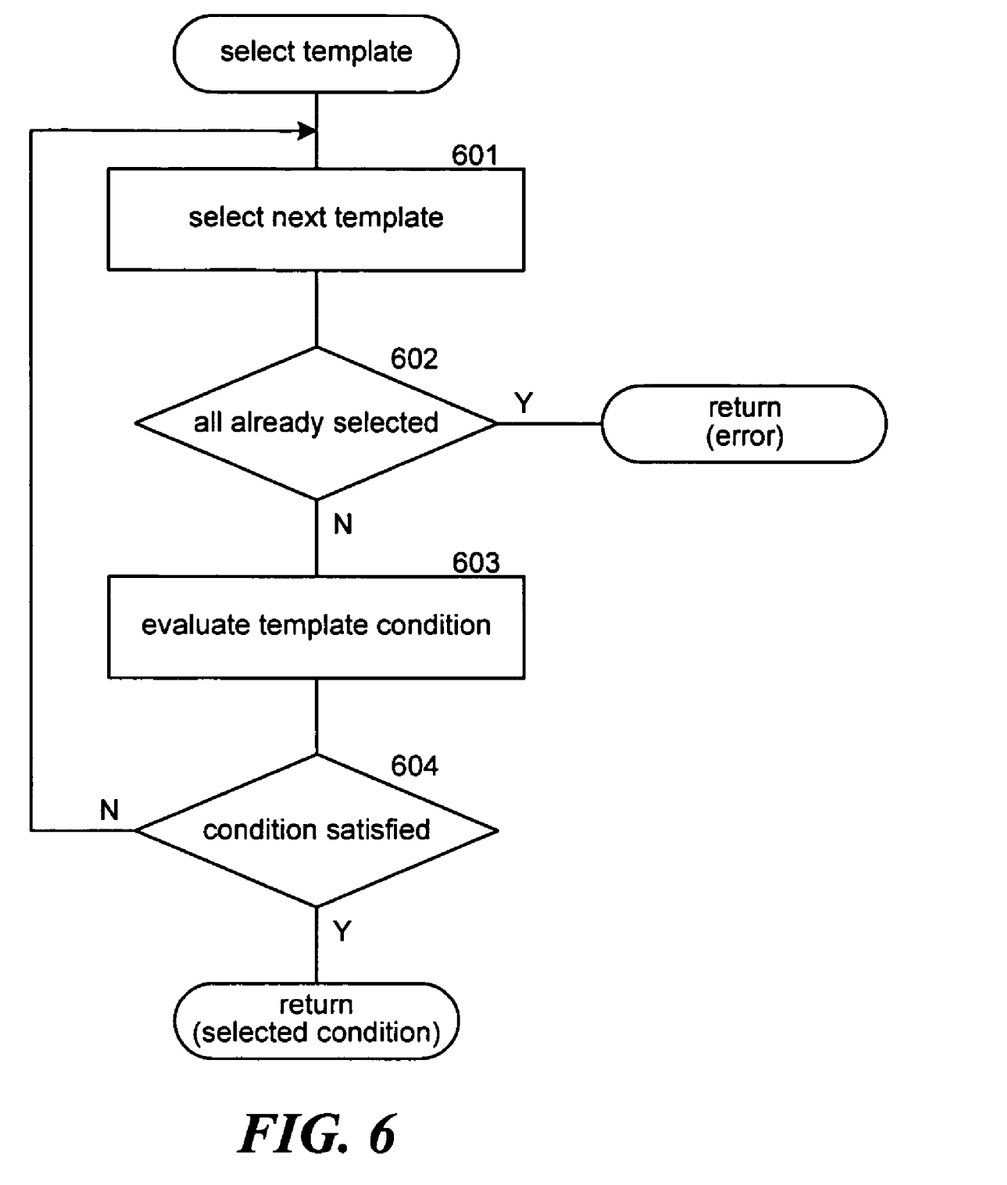
FIG. 6 is a flow diagram that illustrates the processing of the select image template component in one embodiment.

FIG. 6 is a flow diagram that illustrates the processing of the select image template component in one embodiment. The component loops selecting each image template until an image template is selected whose condition is satisfied by the image. Alternatively, the cropping system may select the template that is satisfied by, for example, using the characteristics of the image as an index for selecting a template and avoid the need to loop through the templates. In block 601, the component selects the next image template from the image template store. In decision block 602, if all the image templates of the image template store have already been selected, then no satisfied condition has been found and an error has occurred, else the component continues at block 603. In block 603, the component evaluates whether the image satisfies the condition of the image template. In decision block 604, if the condition is satisfied, then the component returns the selected image template, else the component loops to block 601 to select the next image template.

Figure 7:
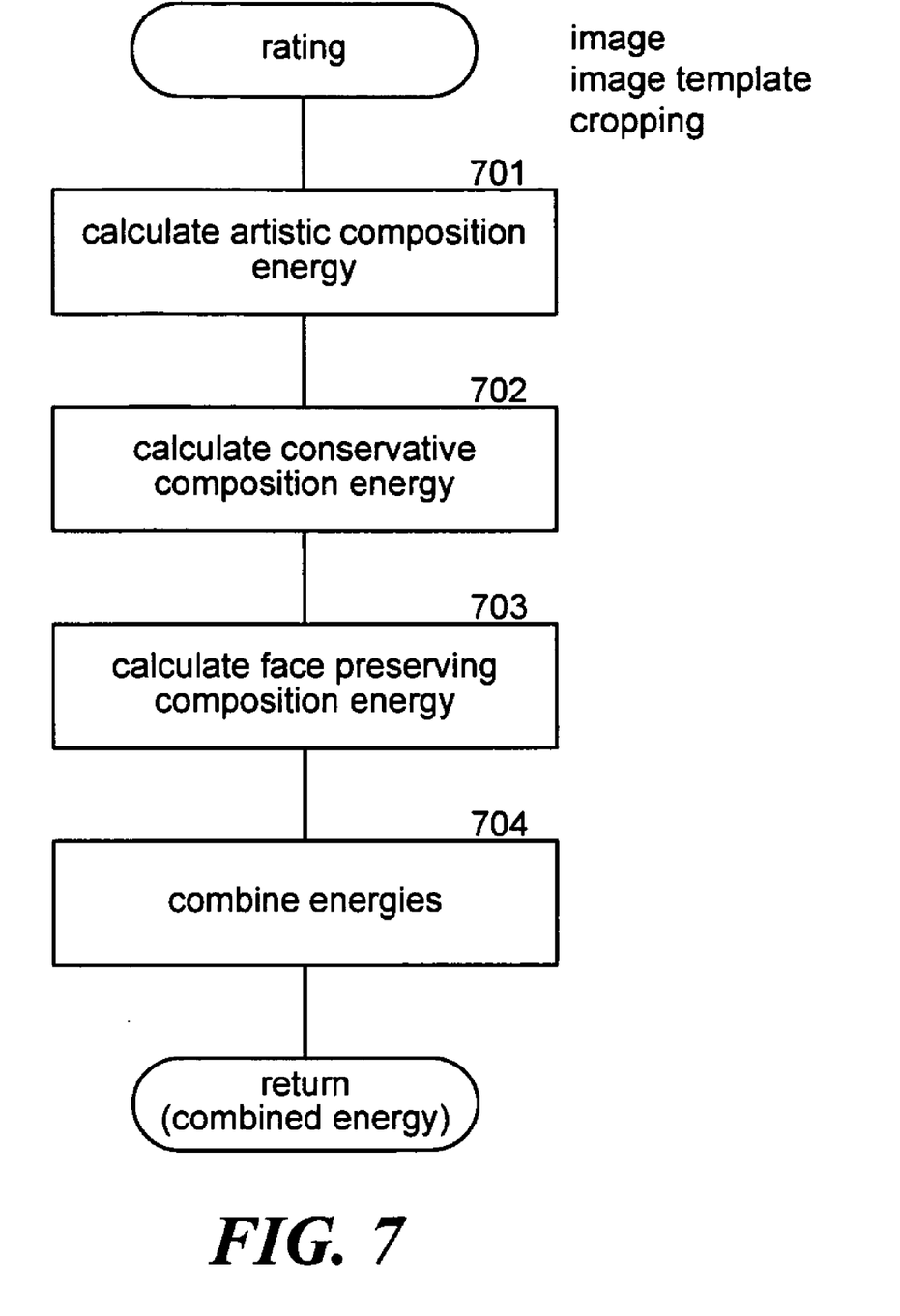
FIG. 7 is a flow diagram that illustrates the processing of the rating component in one embodiment.

FIG. 7 is a flow diagram that illustrates the processing of the rating component in one embodiment. The rating component implements the objective function that the optimizer attempts to optimize when selecting a cropping. The component is passed an image, an image template, and a cropping and returns a rating. In block 701, the component calculates the artistic composition energy between the cropping of the image and the image template. In block 702, the component calculates the original composition energy between the cropping of the image and the image template. In block 703, the component calculates a face preserving composition energy between the cropping of the image and the image template. In block 704, the component combines the energies to give an overall energy or rating for the cropping. The component then returns the combined energy as the rating.

Although the subject matter has been described in language specific to structural features and/or methodological acts, it is to be understood that the subject matter defined in the appended claims is not necessarily limited to the specific features or acts described above. The cropping system may be used in various environments. The cropping system may be used to place the composition of different photographs in a standard form. For example, the cropping system may be used to standardize the composition of photographs of individual students that are to be included in a high school yearbook. Also, the cropping system can be used to normalize the composition of photographs of each class using, for example, the image template CLF or CSF. Accordingly, the invention is not limited except as by the appended claims.

We claim:

1. A method in a computing device with a processor and a computer-readable storage medium for cropping an image with an original composition, the method comprising:

providing image templates, each image template having a condition and a goal for a cropped composition, each condition of an image template specifying a number of one or more face areas within an image, each face area containing one or more faces, and a size of the one or more face areas within the image, each goal of an image template specifying an ideal location of significant areas of an image within a cropped image, the significant areas including face areas and attended areas of an image, an attended area being a region of interest of an image that does not include a face;

providing an objective function that generates an overall rating of a candidate cropping of the image based on a rating of the candidate cropping of the image to meet the goal of an image template, a rating of the original composition of the image relative to the candidate cropping, and a rating of how well the candidate cropping preserves faces;

identifying a number of one or more face areas within the image and the size of the one or more identified face areas, each identified face area containing one or more faces;

selecting an image template whose condition is satisfied by the image based on the identified number of face areas and the identified size of the one or more identified face areas;

identifying the candidate cropping based on the overall rating of the objective function of the candidate cropping to the selected image template; and cropping the image in accordance with the identified candidate cropping wherein the identifying, selecting, and cropping are performed by the processor executing computer-executable instructions stored in the computer-readable storage medium and wherein the image templates and objective function are stored in the computer-readable storage medium.

2. The method of claim 1 wherein the size of the face area is selected from the group consisting of small, medium, and large.

3. The method of claim 1 wherein the number of face areas is selected from the group consisting of one, two, and three or more.

4. The method of claim 1 wherein the objective function factors in an artistic composition rating, an original composition rating, and a face preserving composition rating.

5. The method of claim 1 wherein the identifying of the candidate cropping applies a particle swarm optimization algorithm based on the objective function.

6. A computer-readable storage medium storing instructions for controlling a computer system to identify a cropping for an image with an original composition, by a method comprising:
   providing image templates, each image template having a condition and a goal for a cropped composition, each condition of an image template indicating a number of face areas within an image, each face area containing one or more faces, and a size of the one or more face areas within the image that satisfies the condition of the image template, each goal of an image template specifying an ideal location of face areas and attended areas of an image, an attended area being a region of interest of an image that does not include a face;
   providing an objective function that generates an overall rating of a candidate cropping of the image based on a rating of the candidate cropping of the image to meet the goal of an image template, a rating of the original composition of the image relative to the candidate cropping, and a rating of how well the candidate cropping preserves faces;
   identifying a number of one or more face areas within the image and the size of one or more face areas, each face area containing one or more faces;
   selecting an image template with a condition that matches the image based on comparison of the identified number of face area and the identified size of the identified one or more face areas of the image to the number of face areas and the size of face areas of the condition of the image templates;
   identifying the candidate cropping of the image based on the overall rating of the objective function of the cropping to attain the goal of the selected image template; and
   cropping the image in accordance with the identified candidate cropping.

7. The computer-readable storage medium of claim 6 wherein the identifying of the candidate cropping applies a particle swarm optimization algorithm.

8. The computer-readable storage medium of claim 6 wherein the rating of the candidate cropping indicates closeness of face areas of the cropped image to locations of face areas of the goal of the selected template.

9. A computer system with a processor and computer-readable storage medium to identify a cropping for an image, comprising:
   an image template store having image templates, the image templates having face areas and attended areas, the image templates having associated conditions and goals, each condition of an image template specifying a number and size of one or more face areas within an image that contain a face, each goal of an image template specifying an ideal location of face areas and attended areas of an image within a cropped image, an attended area being a region of interest of an image that does not include a face;
   an objective function component that generates an overall rating of a candidate cropping of the image based on a rating of the candidate cropping of the image to meet the goal of an image template, a rating of the original composition of the image relative to the candidate cropping, and a rating of how well the candidate cropping preserves faces;
   a component that identifies the number and the size of one or more face areas and identifies attended areas of the image to be cropped;
   a component that selects an image template with a condition that matches the image based on number and size of the identified face areas;
   a component that identifies the candidate cropping of the image based on an overall rating of the objective function of the cropping to attain the goal of the selected image template; and
   a component that crops the image in accordance with the identified candidate cropping;
   wherein the components are implemented as computer-executable instructions stored in the computer-readable storage medium for execution by the processor and
   wherein the image template store is stored in the computer-readable storage medium.

* * * * *